(12) United States Patent
Lindner et al.

(10) Patent No.: US 11,651,430 B2
(45) Date of Patent: *May 16, 2023

(54) PRIVATE CURRENCY AND TRADE ENGINE

(71) Applicant: OMNY, Inc., Redwood City, CA (US)

(72) Inventors: Maik Lindner, Roswell, GA (US); Sean O'Brien, Atlanta, GA (US); Faried Amani, Atlanta, GA (US); Alan Pohl, Doraville, GA (US)

(73) Assignee: OMNY, Inc., Atlanta, GA (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/444,818

(22) Filed: Aug. 10, 2021

(65) Prior Publication Data

US 2021/0374860 A1     Dec. 2, 2021

Related U.S. Application Data

(63) Continuation of application No. 16/671,082, filed on Oct. 31, 2019, now Pat. No. 11,094,013.

(Continued)

(51) Int. Cl.
*G06Q 40/04* (2012.01)
*G06Q 20/38* (2012.01)
(Continued)

(52) U.S. Cl.
CPC ............ *G06Q 40/04* (2013.01); *G06Q 10/08* (2013.01); *G06Q 20/065* (2013.01); *G06Q 20/389* (2013.01)

(58) Field of Classification Search
CPC ...... G06Q 40/04; G06Q 10/08; G06Q 20/065; G06Q 20/389; G06Q 20/0658; G06Q 20/401
See application file for complete search history.

(56) References Cited

U.S. PATENT DOCUMENTS

| 7,761,591 B2 | 7/2010 | Graham |
| 7,810,084 B2 | 10/2010 | Egetoft |

(Continued)

FOREIGN PATENT DOCUMENTS

| WO | 0109803 A1 | 2/2001 | |
| WO | WO-0186597 A2 * | 11/2001 | ............. G06Q 20/02 |
| WO | 2014008386 A2 | 1/2014 | |

OTHER PUBLICATIONS

Yang et al.:Optimizing dynamic supply chain formation in supply mesh using CSET model, Sep. 5, 2012, Springer, pp. 5689-588 (Year: 2012).*

(Continued)

*Primary Examiner* — Bijendra K Shrestha
(74) *Attorney, Agent, or Firm* — André J. Bahou; Christopher T. McNeill; Holland & Knight LLP

(57) ABSTRACT

A method may include storing information in a supply mesh. The supply mesh may include two or more value links. The method may include determining that a first value link of the two or more value links fulfills a value link condition of a second value link. The method may include providing a transaction proposal to the first value link. The transaction proposal may include an amount of private currency. The method may include receiving, from the first value link, a transaction acceptance to the transaction proposal. The method may include transferring the amount of private currency from the second value link to the first value link. The method may include confirming completion of a transaction between the first value link and the second value link. The transaction may be based on the transaction proposal. Other methods and systems are also disclosed.

20 Claims, 10 Drawing Sheets

Related U.S. Application Data

(60) Provisional application No. 62/754,379, filed on Nov. 1, 2018.

(51) Int. Cl.
  *G06Q 20/06* (2012.01)
  *G06Q 10/08* (2023.01)

(56) References Cited

U.S. PATENT DOCUMENTS

| | | | |
|---|---|---|---|
| 7,991,659 | B2 | 8/2011 | Berry et al. |
| 9,436,923 | B1 | 9/2016 | Sriram et al. |
| 10,250,639 | B2 | 4/2019 | Redlich et al. |
| 10,296,258 | B1 | 5/2019 | Richardson |
| 10,419,218 | B2 | 9/2019 | Bonnell et al. |
| 10,438,209 | B2 | 10/2019 | Kurian et al. |
| 10,445,698 | B2 | 10/2019 | Hunn et al. |
| 10,552,805 | B2 | 2/2020 | Chan et al. |
| 10,581,613 | B2 | 3/2020 | Ford et al. |
| 10,608,910 | B2 | 3/2020 | Moeller |
| 10,664,799 | B2 | 5/2020 | O'Brien et al. |
| 10,868,676 | B2 | 12/2020 | Nguyen et al. |
| 2002/0062257 | A1 | 5/2002 | Minamishin et al. |
| 2013/0006795 | A1 | 1/2013 | Kahn |
| 2013/0151409 | A1 | 6/2013 | Stine et al. |
| 2013/0159045 | A1 | 6/2013 | Ettl et al. |
| 2014/0019471 | A1 | 1/2014 | Linton et al. |
| 2014/0172708 | A1 | 6/2014 | Chrapko et al. |
| 2015/0046363 | A1* | 2/2015 | McNamara ........ G06Q 10/0833 705/333 |
| 2015/0178645 | A1 | 6/2015 | Yuan et al. |
| 2016/0104089 | A1 | 4/2016 | Speich et al. |
| 2016/0292672 | A1 | 10/2016 | Fay et al. |
| 2016/0300200 | A1* | 10/2016 | Brown ................ G06Q 20/384 |
| 2017/0046664 | A1 | 2/2017 | Haldenby et al. |
| 2017/0103385 | A1 | 4/2017 | Wilson, Jr. et al. |
| 2017/0199987 | A1 | 7/2017 | Loeb et al. |
| 2018/0083771 | A1 | 3/2018 | Bonnell et al. |
| 2018/0204201 | A1* | 7/2018 | Cheek ................ G06Q 20/405 |
| 2019/0215149 | A1 | 7/2019 | Ramasamy et al. |
| 2020/0065826 | A1 | 2/2020 | Gering et al. |

OTHER PUBLICATIONS

Dwyer et al.: The Economics of Bitcoin and Similar Private Digital Currencies, May 8, 2014, MPRA Munich Personal RePEc Archive, pp. '1-31 (Year: 2014).*

Milling, W.: Private Currency Competition Is The Monetary Answer, Aug. 13, 2012, Capital Flows, pp. 1-10 (Year: 2012).*

Brown et al.: Why Supply Mesh is the New Supply Chain and What that Means for Investors, Dec. 2020, Issue 3.2, KKR, pp. 1-32 (Year: 2020).*

"Blockchain", Wikipedia, downloaded from: https://en.wikipedia.org/wiki/Blockchain, Jun. 24, 2021, pp. 1-19.

"Distributed ledger", Wikipedia, downloaded from: https://en.wikipedia.org/wiki/Distributed_ledger, Jun. 24, 2021, pp. 1-2.

Barkataki et al.: On achieving secure collaboration in supply chains, Oct. 8, 2013, Springer, pp. 691-705 (Year: 2013).

Bocek, Thomas, et al., "Blockchains Everywhere—A Use-case of Blockchains in the Pharma Supply-Chain", 2017 International Symposium on Integrated Network and Service Management, Lisbon, Portugal, May 8-12, 2017, pp. 772-777.

Englehardt, Mark A., "Hitching Healthcare to the Chain: An Introduction to Blockchain Technology in the Healthcare Sector", Technology Innovation Management Review, vol. 7, Issue 10, Oct. 2017, 14 pages.

Hang Yang et al., "Mediating Dynamic Supply Chain Formation by Collaborative Single Machine Earliness/Tardines Agents in Supply Mesh", Mathematical Problems in Engineering, vol. 2014, Article ID 535890, 21 pages, 2014. https://doi.org/10.1155/2014/535890 (last accessed Mar. 16, 2021).

Kuo, Tsung-Ting, et al., "Blockchain distributed ledger technologies for biomedical and health care applications", Journal of the American Informatics Associations, Oxford University Press, vol. 24, No. 6, Sep. 8, 2017, pp. 1211-1220.

Lei et al.: Learning-Based Web Service Competition in Uncertain Environments, Jul. 26, 2013, Journal of Web Engineering, vol. 13, No. 5 &6, pp. 450-468 (Year: 2013).

Yang et al.: Optimizing dynamic supply chain formation in supply mesh using CSET model, Sep. 5, 2012, Springer, pp. 569-588 (Year: 2012).

* cited by examiner

400

| Field | Value |
|---|---|
| 412 — Source Value Link | Business A — 452 |
| 414 — Destination Value Link | Business B — 454 |
| 416 — Subject | Oxycodone — 456 |
| 418 — Subject Amount | 30 — 458 |
| 420 — Subject Amount Unit | 10 milligram pill — 460 |
| 422 — Timestamp | 2020-09-27 13:14:57 — 462 |

410 = Field column; 450 = Value column

| Field | Value | |
|---|---|---|
| 412 — Source Value Link | Business A | 452 |
| 414 — Destination Value Link | Business B | 454 |
| 416 — Subject | Oxycodone | 456 |
| 418 — Subject Amount | 30 | 458 |
| 420 — Subject Amount Unit | 10 milligram pill | 460 |
| 424 — Private Currency Amount | 43 | 464 |
| 422 — Timestamp | 2020-09-27 13:14:57 | 462 |

FIG. 4B

PRIVATE CURRENCY AND TRADE ENGINE

CROSS-REFERENCES TO RELATED APPLICATIONS

This application is a continuation of U.S. patent application Ser. No. 16/671,082, entitled "Private Currency and Trade Engine," and was filed on Oct. 31, 2019, which is now patented as U.S. Pat. No. 11,094,013, and issued on Aug. 17, 2021; which claims priority to U.S. Provisional Patent Application No. 62/754,379, entitled "Private Currency and Trade Engine," which was filed Nov. 1, 2018. The entirety of these references are hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to private currency and more particularly to private currency and trade engines.

Some industries, such as healthcare, may be subject to numerous regulations, legislation, and market economics. Actors in these industries may face several burdensome hurdles to conduct certain business because of these identified problems and because of other difficulties. Furthermore, the actors in an industry may desire to do business with each other such as selling excess products to each other. A lack of data transparency can make it difficult to determine which actors can help fulfill a business need of another actor and if an actor is proposing a fair price in a proposed transaction.

What is needed then are improvements to private currency and trade engines.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A private market utilizing private currency and a trade engine helps in overcoming the problems identified in the Background section, in addition to other problems. Entities trading in a private market using private currency avoids some regulations that apply to entities trading in a more open market and with fiat currency. Furthermore, the trade engine provides data transparency and rules, procedures, and processes for determining fair prices for transactions within the private market. A distributed ledger utilized by the trade engine or the actors provides immutable proof of transactions, which can be used by regulators, auditors, or other personnel.

One aspect of the disclosure is a computer-implemented method. The method may include storing information in a supply mesh. The supply mesh may include two or more value links. The method may include determining that a first value link of the two or more value links fulfills a value link condition of a second value link. The method may include providing a transaction proposal to the first value link. The transaction proposal may include an amount of private currency. The method may include receiving, from the first value link, a transaction acceptance to the transaction proposal. The method may include transferring the amount of private currency from the second value link to the first value link. The method may include confirming completion of a transaction between the first value link and the second value link. The transaction may be based on the transaction proposal.

Another aspect of the disclosure includes a system. The system may include one or more non-transitory storage devices. The one or more non-transitory storage devices may include a supply mesh, which may include two or more value links. The system may include one or more computer-readable instructions. The one or more computer-readable instructions, when executed by a processor, may be configured to execute a trade engine. The trade engine may be configured to determine that a first value link of the two or more value links fulfills a value link condition of a second value link; provide a transaction proposal to the first value link; receive, from the first value link, a transaction acceptance to the transaction proposal; transfer the amount of private currency from the second value link to the first value link, and confirm completion of a transaction between the first value link and the second value link. The system may include a distributed ledger. The distributed ledger may be configured to track, for each value link of the two or more value links, an inventory amount and a private currency balance.

Another aspect of the disclosure may include a method. The method may include storing information in a computer-implemented supply mesh. The supply mesh may include two or more value links. The method may include initializing a computer-implemented trade engine. The trade engine may include one or more computer-readable instructions that, when executed by a processor, cause the trade engine to determine that a first value link of the two or more value links fulfills a value link condition of a second value link. The method may include initializing a distributed ledger. The distributed ledger may track, for each value link of the two or more value links, an inventory amount and a private currency balance. The method may include distributing private currency to each of the two or more value links of the supply mesh.

The invention of the disclosure provides several improvements to the functioning of computers. For example, the trade engine provides data transparency to the computing devices of entities within a supply mesh, allowing for the computing devices in the private market to automatically determine fair prices or determine whether an actor fulfills a business need of another entity. The trade engine and distributed ledger provide immutable proof of transactions that can be publicly visible instead of being siloed in a central data storage as is the case with conventional computing. The invention of the disclosure also provides for automatic distribution of private currency based on a variety of factors such as trading history that is tracked through a distributed ledger or other computer data storage.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 4A is an table diagram illustrating one embodiment of a distributed ledger transaction for a private currency and trade engine.

FIG. 4B is an table diagram illustrating another embodiment of a distributed ledger transaction for a private currency and trade engine.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
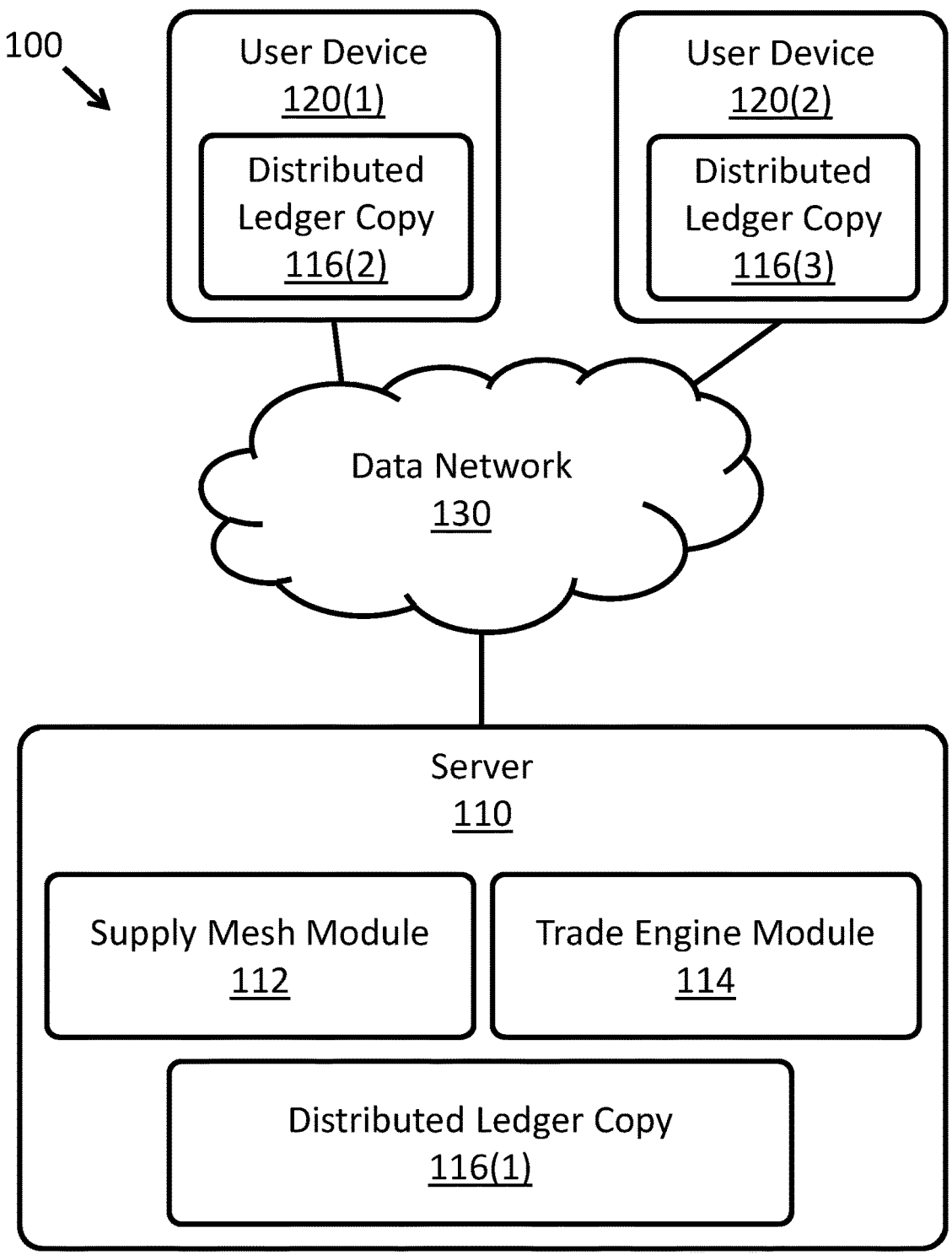
FIG. 1 is a schematic block diagram illustrating one embodiment of a system for a private currency and trade engine.

FIG. 1 depicts one embodiment of a system 100. The system 100 may include a system for a private currency and trade engine. The system 100 may include a server 110. In some embodiments, the server 110 may include a supply mesh module 112. The server 110 may include a trade engine module 114. The server 110 may include a distributed ledger copy 116(1).

In some embodiments, the system 100 may include one or more user devices 120(1)-(n). Although two user devices 120(1)-(2) are depicted in FIG. 1, the system 100 may include any number of user devices 120(1)-(n). As discussed herein, a single user device, in general, is referred to as a "user device 120," a particular user device is referred to as "user device 120(1)," "user device 120(2)," etc., and all of the one or more user devices are referred to as "the one or more user devices 120(1)-(n)." Each user device 120 of the one or more user devices 120(1)-(n) may include a distributed ledger copy 116. For example, user device 120(1) may include the distributed ledger copy 116(2), and the user device 120(2) may include the distributed ledger copy 116(3).

In one or more embodiments, the system 100 may include a data network 130. The server 110 and the one or more user devices 120(1)-(n) may be in data communication with each other via the data network 130. The server 110 and the one or more user devices 120(1)-(n) may send data over the data network 130 and may receive data over the data network 130.

The following is a brief overview of one embodiment of the system 100. The server 110 may include a computing device such as an application server. The supply mesh module 112 may include software installed and executable on the server 110 that generates a supply mesh, interacts with the supply mesh, stores the supply mesh, or otherwise processes data associated with the supply mesh. In some embodiments, the supply mesh may include data that represents entities. The data that represents entities may be referred to as "value links." The supply mesh may include data that represents characteristics about those entities. The data that represents these characteristics may be referred to as "value link features." The supply mesh may include data that represents relationships between entities. The data that represents these relationships may be referred to as "transitions."

The trade engine module 114 may include software installed on the server 110, and the trade engine module 114 may be configured to facilitate the transfer of goods or services between entities that are represented in the supply mesh of the supply mesh module 112. The transfer of goods or services may include the transfer of private currency between entities in the supply mesh.

The distributed ledger copy 116(1) may include one or more distributed ledger transactions. The distributed ledger transactions may include data about the entities in the supply mesh such as transfers of inventory or private currency between entities in the supply mesh. The distributed ledger copies 116(1)-(n) may include a copy of a distributed ledger that is distributed and duplicated among multiple computing devices according to a consensus mechanism of the distributed ledger.

The trade engine module 114 may be configured with a value link condition that is associated with a second value link. For example, the value link condition may include that the entity represented by the second value link has an inventory of a certain drug and the inventory level of that drug has fallen below 20 units. The trade engine module 114 may determine that the value link condition of the second value link has been fulfilled by reading from the distributed ledger copy 116(1). The distributed ledger copy 116(1) may track the second value link's inventory level of the drug.

The trade engine module 114 may be configured to determine if another entity represented by another value link can supply an amount of the certain drug to the second value link. The trade engine module 114 may read from the distributed ledger copy 116(1) to determine other value links' inventory levels of that drug and if any of those other value links have extra inventory of that drug or are willing to sell or otherwise transfer an amount of that drug to the second value link. A value link that fulfills some of these conditions may be referred to as a "first value link."

The trade engine module 114 may provide a transaction proposal to the first value link. The transaction proposal may include an offer for the first value link to transfer an amount of the drug to the second value link. The transaction proposal may include an amount of private currency that the first value link will receive from the second value link in exchange for the transfer. The trade engine module 114 may calculate the amount of private currency based on a variety of factors. The first value link may send the trade engine module 114 an acceptance of the transaction proposal, and the trade engine module 114 may receive the acceptance of the transaction proposal from the first value link.

The trade engine module 114 may transfer the amount of private currency from the second value link to the first value link. For example, the trade engine module 114 may generate a distributed ledger transaction that includes data describing the transfer of the amount of private currency from the second value link to the first value link. The trade engine module 114 may send that distributed ledger transaction to nodes of the distributed ledger so that the distributed ledger transaction can be added to the distributed ledger via the consensus mechanism, thus adding the transaction to the one or more distributed ledger copies 116(1)-(*n*).

The trade engine module 114 may confirm completion of a transaction between the first value link and the second value link. The transaction between the first value link and the second value link may include the amount of the certain drug being transferred from the first value link to the second value link. The second value link may generate a distributed ledger transaction indicating that the second value link received the amount of the certain drug. The trade engine module 114 may confirm the completion by reading this information from the distributed ledger copy 116(1).

The following explains details of some embodiments of the present disclosure. In one or more embodiments, the system 100 (including its individual components) may use a private currency. The private currency may include a currency or unit of value issued by a private entity. In one embodiment, the trade engine module 114 or an entity that controls the trade engine module 114 may issue the private currency to the plurality of entities. The private currency may be used or exchanged among a plurality of entities. The entities may include the value links of the supply mesh. In some embodiments, each value link may include a balance of private currency. A value link may receive private currency (e.g., issued by the trade engine module 114 or received from other value links) to increase its private currency balance. The value link may transfer private currency (e.g., to another value link in exchange for a product or service) to decrease its private currency balance. In some embodiments, each value link's balance may be stored by the trade engine module 114 or tracked on the distributed ledger copy 116(1). The balances of private currency may be kept private from other value links or may be public to one or more other value links.

In one embodiment, the private currency may operate differently than a cryptocurrency. For example, a transaction using private currency may not have a transaction confirmation as some cryptocurrency transactions do. In another example, transactions using private currency may not be pseudonymous because the identities of the value links may be known among each other. Joining the plurality of trading partners may require permission (e.g., from the trade engine module 114 or the plurality of trading partners utilizing the private currency). The distributed ledger used by the trading partners may be a private ledger, unlike some cryptocurrency distributed ledgers. Also, in some embodiments, the purchasing price of private currency for goods and services may be regulated, unlike a cryptocurrency. Some, none, or all of these differences may apply to the private currency discussed in the present disclose. However, in some embodiments, the private currency may include a cryptocurrency.

It should be noted that that the terms "send to a value link," "receive from a value link," or other similar terms may include sending/receiving something to an entity or a computing device controlled by the entity that the value link represents. As an example, the entity "Business A" may control the user device 120(1), and the supply mesh may represent Business A as a first value link. The entity "Business B" may control the user device 120(2), and the supply mesh may represent Business B as a second value link. Thus, the trade engine module 114 sending a transaction proposal to the first value link may include the trade engine module 114 sending the transaction proposal to the user device 120(1). A transaction between the first value link and the second value link may include a transaction between Business A and Business B (e.g., Business A sending a shipment of pharmaceutical products to Business B's warehouse).

In one embodiment, the server 110 may include an application server, a database server, another type of server, a desktop computer, laptop computer, tablet computer, mobile computing device, or some other type of electronic device. The server 110 may include a non-transitory storage device, such as a hard disk, flash memory, random access memory (RAM), or other types of non-transitory storage devices. The server 110 may store data on the non-transitory storage device such as the supply mesh module 112, the supply mesh of the supply mesh module 112, the trade engine module 114, or the distributed ledger copy 116(1). The server 110 may include one or more processors for executing computer-readable instructions or processing other data.

In some embodiments, the one or more user devices 120(1)-(*n*) may include servers, desktop computers, laptop computers, mobile computing devices, or some other type of computing device. A user device 120 may include client software installed on the user device 120. The client software may include software configured to communicate with the server 110 or other user devices 120(1)-(*n*). The client software may communicate with the server 110 to receive data about the supply mesh, send data to the trade engine module 114, send transaction proposal responses to the trade engine module 114, or otherwise communicate with or effect change on the server 110.

In one embodiment, a user device 120 may include a node of the distributed ledger of the distributed ledger copies 116(1)-(*n*). The node may include software configured to perform functionality related to the distributed ledger such as receiving distributed ledger transactions, validating distributed ledger transactions, updating distributed ledger copies 116(1)-(*n*) based on the distributed ledger's consensus mechanism, or other distributed ledger functionality. In some embodiments, the client software of the user device 120 may include the node. In other embodiments, the node may be separate from the client software.

In some embodiments, a distributed ledger copy 116 may include data that has been distributed and synchronized across multiple distributed ledger copies. A distributed ledger copy 116 may be stored on a computing device. The distributed ledger copy 116 may be stored as one or more files in persistent storage, data in memory, or in some other format. In one embodiment, the distributed ledger may include a blockchain. In other embodiments, the distributed ledger may include some other type of distributed ledger format. The distributed ledger may be permissioned or permissionless. The distributed ledger may be public or private. In some embodiments, the distributed leger copy 116 may include one or more distributed ledger transactions. A node configured to perform functionality related to the distributed ledger may process the distributed ledger transactions to determine a state of entities represented in the distributed ledger (e.g., determining a private currency balance of an entity, determining an inventory level of an entity, etc.).

In some embodiments, a distributed ledger copy 116 may be configured to track an inventory amount of a value link in the supply mesh. The distributed ledger copy 116 may track a private currency balance of a value link in the supply mesh. In one embodiment, the distributed ledger copy 116 may track data associated with a value link using one or more distributed ledger transactions. In some embodiments, a distributed ledger transaction may store data about the distributed ledger transaction directly in the distributed ledger transaction. In other embodiments, the distributed ledger transaction may store a link to data about the distributed ledger transaction, and the data about the distributed ledger transaction can be read by following the link.

In one or more embodiments, the distributed ledger 116 may use a consensus mechanism to keep the distributed ledger copies 116(1)-(n) synchronized with the same data. The consensus mechanism may include rules or procedures the distributed ledger nodes of the distributed ledger network follow in order to determine which data to add to the ledger and in what order. The consensus mechanism may include proof-of-work, proof-of-stake, delegated proof-of-stake, Byzantine fault tolerance, proof-of-identity, proof-of-elapsed time, an endorsement system (e.g., the endorsement system used by the Hyperledger Fabric framework provided by the Hyperledger Project), or some other consensus mechanism.

In one embodiment, the data network 130 may include a local area network (LAN), wide area network (WAN), a wireless network, a wired network, the Internet, or some other kind of data network. The data network 130 may facilitate transmission of data between connected components of the data network 130. The data network may include wires, routers, switches, servers, internet service providers (ISPs), or other network components. The one or more components of the system 100 may send data, inquiries, queries, requests, notifications, messages, responses, or other information to each other via the data network. These categories of information may not be exclusive and may overlap. Such information may be sent in data packets using networking protocols such as Internet Protocol (IP), Transmission Control Protocol (TCP), or other methods of sending data in a network.

Figure 2:
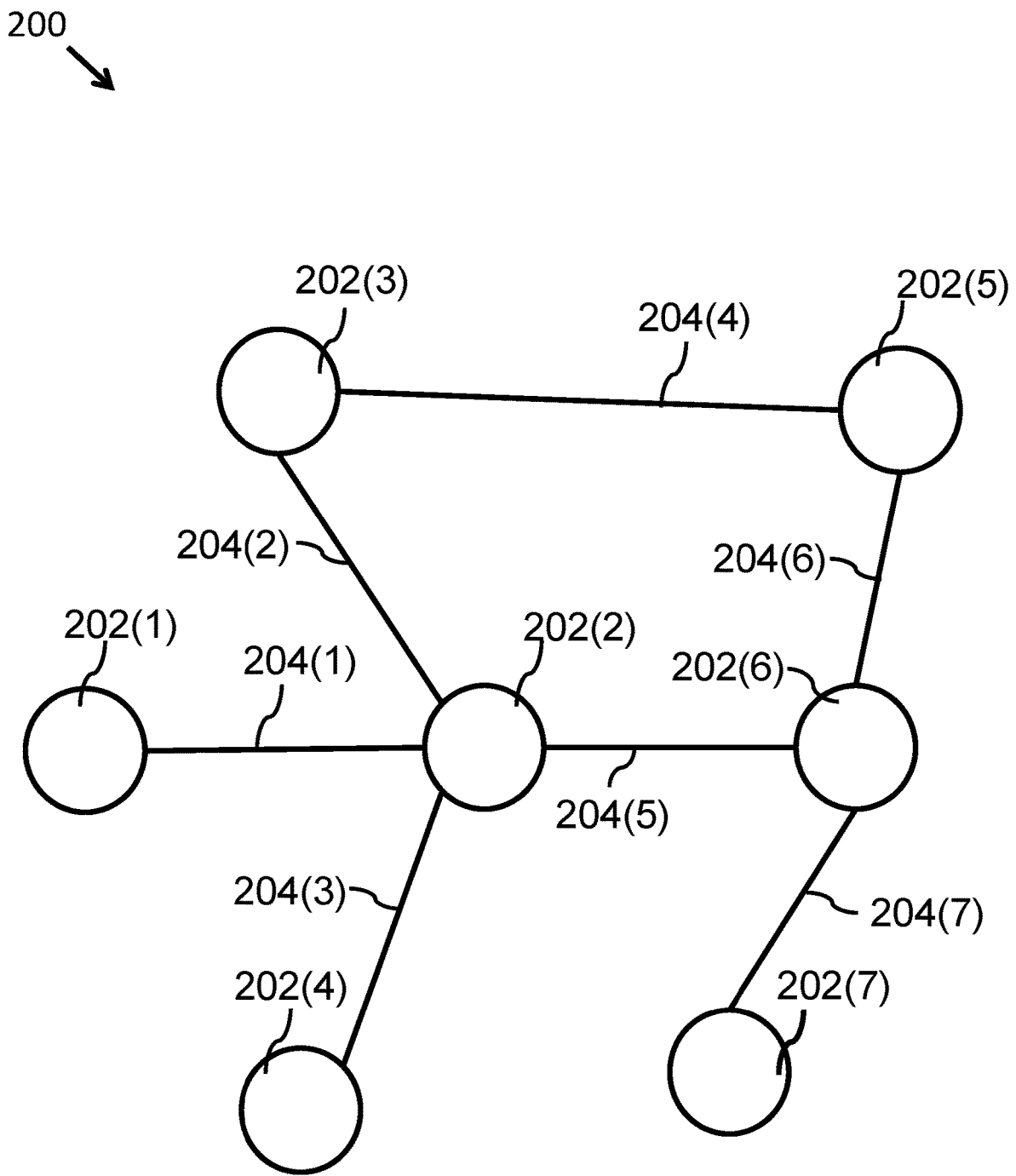
FIG. 2 is a schematic block diagram illustrating one embodiment of a supply mesh for a private currency and trade engine.

FIG. 2 depicts one embodiment of a supply mesh 200. In some embodiments, the supply mesh 200 may include one or more value links 202(1)-(n). The supply mesh 200 may include one or more transitions 204(1)-(n). As used herein, a "value link 202" may include a data representation of an entity or a group of entities. For example, a value link 202 may include a data representation of a person, a corporation, a non-profit organization, or some other entity.

Each value link 202 may include one or more value link features. A value link feature may include data associated with and about its corresponding value link 202. Examples of value link features may include data about a product or service the value link 202 owns or offers. For example, a value link feature associated with a certain product may include an inventory level of that product, a price the value link 202 is willing to sell the product for, an expiration date of the product, or other product data. A value link 202 may include other information associated with the value link 202.

A transition 204 may include a data representation of a relationship between two or more value links 202(1)-(n). For example, a transition 204 may indicate that a first value link 202(1) is a subsidiary of a second value link 202(2), that a first value link 202(1) supplies a product or service to a second value link 202(2), that a first value link 202(1) supplies data to a second value link 202(2), that the first value link 202(1) and second value link 202(2) form a portion of a supply chain, or some other type of relationship between the value links 202(1)-(2). In some embodiments, a transition may be unidirectional (indicating a one-way flow from the first value link 202(1) to the second value link 202(2)) or bidirectional.

In one embodiment, the supply mesh module 112 may obtain information used by the supply mesh 200 from the distributed ledger copy 116(1). For example, a value link feature may include a product inventory level of the corresponding value link 202. The supply mesh module 112 may read from the distributed ledger copy 116(1) in order to obtain or determine this information. In some embodiments, the supply mesh 200 may be stored as part of the supply mesh module 112. In other embodiments, the supply mesh 200 may be stored in another portion of the server 110 or on a computing device other than the server 110, and the supply mesh module 112 may be in data communication with the supply mesh 200 in order to process data associated with the supply mesh 200.

In one or more embodiments, a component of the system 100 or another device may access data, modify data, or otherwise interact with the data in the supply mesh 200 through the supply mesh module 112. For example, the user device 120(1) may send a request for data that is stored by the supply mesh 200 to the supply mesh module 112. The supply mesh module 112 may interact with the supply mesh 200 to obtain the requested data. The supply mesh module 112 may then send the requested data to the user device 120(1). In one embodiment, a component of the system 100 or another device may interact with the supply mesh 200 by interacting with the supply mesh 200 directly or reading from the supply mesh 200 directly instead of using the supply mesh module 112.

In some embodiments, the trade engine module 114 may include software installed on or executed by the server 110. The trade engine module 114 may support or enforce rules for transactions between value links 202(1)-(n) of the supply mesh 200. The trade engine module 114 may calculate or determine a price (in private currency) for a transaction between value links 202(1)-(n) of the supply mesh 200. The trade engine module 114 may determine a value link's 202 inventory level for a product or the value link's 202 availability to provide a service. The trade engine module 114 may provide escrow services for value links 202(1)-(n) of the supply mesh 200.

In one embodiment, the trade engine module 114 may be configured to determine that a first value link 202(1) of the two or more value links 202(1)-(n) fulfills a value link condition of a second value link 202(2). The trade engine module 114 determining that a first value link 201(1) fulfills the value link condition of the second value link 202(2) may include determining that the value link condition has been triggered. The value link condition being triggered may include a value link feature of the corresponding value link 202 has taken on a certain state. Examples of a value link condition include a first inventory amount of the second value link 202(2) being below a predetermined amount, the first value link 202(1) being willing to sell a second inventory amount at a predetermined amount of private currency, an expiration date of the second value link 202(2) being a predetermined time period away from a predetermined date, or some other condition. In some embodiments, a user inquiry or business need may include a value link condition.

In one or more embodiments, the value link condition may include a first inventory amount of the second value link 202(2) being below a predetermined amount.

For example, the second value link 202(2) may have a policy of having at least 20 units of the drug Oxycodone in its inventory at all times. If the second value link's 202(2) inventory falls below 20 units of Oxycodone, the value link condition may be triggered. In a further example, the trade engine module 114 may determine that the second value link 202(2) has fewer than 20 units of Oxycodone by reading the second value links' 202(2) inventory level from the distributed ledger copy 116(1). In another further example, the user device 120(2), which may be operated by the second value link 202(2), may send a notification to the server 110 via the data network 130. The trade engine module 114 may receive the notification, which may include data describing that the second value link 202(2)'s inventory level of Oxycodone has fallen below 20 units, and that the second value link 202(2) is seeking to purchase Oxycodone from another value link 202 in the supply mesh 200.

In one embodiment, the value link condition may include the first value link 202(1) being willing to sell a second inventory amount at a predetermined amount of private currency. The predetermined amount of private currency may include an amount determined or set by the first value link 202(1), an amount calculated or determined by the trade engine module 114, or another amount. As an example, the trade engine module 114 may read from the supply mesh 200 or the distributed ledger 116(1) and determine that the first value link 202(1) has indicated that it is willing to sell up to 50 units of Fexofenadine for 15 units of private currency per unit of Fexofenadine.

The value link condition may include an expiration date of the second value link 202(2) being a predetermined time period away from a predetermined date. For example, the second value link 202(2) may have, in its inventory, 20 units of Oxycodone that expire on Apr. 5, 2020. The second value link 202(2) may have a policy that drugs that expire in fewer than 30 days should be sold to other value links instead of being kept in inventory. The trade engine module 114 may determine that the current date is Mar. 7, 2020 (29 days before the expiration date). In response, the trade engine module 114 may determine that a value link condition of the second value link 202(2) is triggered.

In some embodiments, the trade engine module 114 may store the value link condition. The trade engine module 114 may read and process data from the supply mesh module 114, the supply mesh 200, or the distributed ledger copy 116(1) to determine whether any of the stored value link conditions have been triggered. In one embodiment, a user device 120(1) may send a notification, message, or other data to the server 110 notifying the trade engine module 114 that a value link condition has been triggered. In response to the trade engine module 114 receiving this data, the trade engine module 114 may determine that a value link condition has been triggered.

In some embodiments, the trade engine module 114 determining that a first value link 202(1) of the two or more value links 202(1)-(n) fulfills a value link condition of a second value link 202(2) may include the trade engine module 114 determining that the first value 202(1) includes one or more value link features that can cause the value link condition to no longer be true. The trade engine module 114 may determine that the first value link 202(1) includes extra inventory of a product or is able to provide a service that the second value link 202(2) is seeking because of the value link condition, The trade engine module 114 may determine that the first value link 202(1) is seeking to buy a product that the second value link 202(2) has a surplus of and at a price that the second value link 202(2) is willing to sell for. Other value link features that cause the value link condition to no longer be true are also envisioned.

In one embodiment, the trade engine module 114 may provide a transaction proposal to the first value link 202(1). The transaction proposal may include an amount of private currency. The trade engine module 114 may provide the transaction proposal to the first value link 202(1) in response to the first value link's 202(1) ability to fulfill the value link condition of the second value link 202(2). In some embodiments, the trade engine module 114 may determine whether one or more value link conditions fulfill one or more other value link conditions. Determining whether a first value link condition fulfills a second value link condition may be based on an inventory level, whether a value link 202 is willing to sell or otherwise provide a product or service, a maximum price a value link 202 is willing to pay for a product/service, a minimum price at which a value link 202 is willing to sell a product/service, an expiration date of a product/service, or other information.

As an example, the trade engine module 114 may determine that a second value link 202(2)'s inventory of Oxycodone has fallen below the minimum level of 20 units and that the second value link 202(2) is willing to purchase units of Oxycodone from other value links 202 at a maximum price of 18 units of private currency per unit of Oxycodone. The trade engine module 114 may determine that a first value link 202(1) has indicated it is willing to sell up to 30 units of Oxycodone for 16 units of private currency per unit of Oxycodone. The trade engine module 114 may compare the value link conditions to determine that the product of each value link condition matches, that the first value link's 202(1) surplus inventory exceeds the second value link's 202(2) minimum inventory, and that the first value links 202(1) selling price is less than the second value link's 202(1) maximum buying price. Based on these determinations, the trade engine module 114 may determine that the first value link's 202(1) value link conditions fulfills the second value link's 202(2) value link condition.

In one or more embodiments, the trade engine module 114 may receive, from the first value link 202(1), a transaction acceptance to the transaction proposal. The transaction acceptance may include data indicating that the first value link 202(1) will fulfill the need indicated in the transaction proposal.

In some embodiments, the trade engine module 114 may transfer the amount of private currency from the second value link 202(2) to the first value link 202(1). Transferring the amount of private currency may include the trade engine module 114 generating a distributed ledger transaction. The distributed ledger transaction may include data indicating that the second value link 202(2) is the sender of the amount of the private currency and that the first value link 202(1) is the recipient of the amount of the private currency. The distributed ledger transaction may include data indicating the amount of the private currency being sent. The trade engine module 114 may send copies of the transaction to the nodes of the distributed ledger network so that the distributed ledger transaction can be validated and added to the distributed ledger via the consensus mechanism of the distributed ledger.

In one or more embodiments, the trade engine module 114 may be configured to confirm completion of a transaction between the first value link 202(1) and the second value link 202(2). The transaction may be based on the transaction proposal. The transaction may include a transaction that fulfills the value link condition of the second value link 202(2). For example, continuing the example above, the transaction may include the first value link 202(1) sending the second value link 202(2) a number of units of Oxycodone sufficient to bring the second value link's 202(2) inventory of Oxycodone above 20 units.

The trade engine module 114 may confirm completion of the transaction in a variety of ways. The trade engine module 114 being configured to confirm completion of the transaction may include the trade engine module 114 being configured to record the transaction on a distributed ledger copy 116(1). The trade engine module 114 may receive data, a notification, a message, or some other indication from the second value link 202(2) that the transaction has been completed. For example, the trade engine module 114 may receive a notification from the client software of the user device 120(2) indicating that the second value link 202(2) has received a shipment of Oxycodone from the first value link 202(1). The trade engine module 114 being configured to confirm completion of the transaction may include the trade engine module 114 being configured to determine, from the distributed ledger copy 116(1), the completion of the transaction. The trade engine module 114 may periodically check the distributed ledger copy 116(1) for a distributed ledger transaction or other distributed ledger data indicating that the second value link's 202(2) value link condition has been fulfilled. For example, the trade engine module 114 may read from the distributed ledger copy 116(1) and detect a distributed ledger transaction that the second value link 202(2) added to the distributed ledger indicating that it receive the shipment of Oxycodone from the first value link 202(1).

In some embodiments, the trade engine module 114 may not send the transaction proposal to the first value link 202(1). Instead, the trade engine module 114 may send a transaction notification to the first value link 202(1). The transaction notification may include information similar to the information of the transaction proposal, such as the identity of the second value link 202(2), a product or service, a location (e.g., where to send the product to or where to provide the service), a private currency amount, or other transaction information. The transaction notification may obligate the first value link 202(1) to perform the transaction. The first value link 202(1) may not have the discretion to decline the transaction described in the transaction notification. The trade engine module 114 may automatically transfer the private currency amount from the second value link 202(2) to the first value link 202(1).

In one embodiment, the trade engine module 114 may be configured to transfer the amount of private currency from the second value link 202(2) to the first value link 202(1) before the trade engine module 114 confirms completion of the transaction, after the trade engine module 114 confirms completion of the transaction, or the trade engine module 114 may perform the transferring and confirming substantially simultaneously.

In some embodiments, the trade engine module 114 may be further configured to receive purchase data of the first value link 202(1). The purchase data may include a purchase price or an inventory amount. In one embodiment, the trade engine module 114 may record, on the distributed ledger, the purchase data. In other embodiments, the first value link 202(1) may record the purchase data on the distributed ledger. The purchase data may be associated with a product or service that the first value link 202(1) received. The product or service may have originated outside of the entities of the supply mesh 200. As an example, the first value link 202(1) may purchase 30 units of morphine from a pharmaceutical company for $900. The purchase data may include the purchase price of $900, and the purchase data may include the inventory amount of 30 units of morphine.

In one or more embodiments, purchase data may include data about products or services received, manufactured, or otherwise procured, even if the first value link did not purchase the products or services. The term "purchase data" should not be construed to require that the purchase data requires some sort of exchange of value. For example, if the first value link 202(1) received a shipment of medical devices for free from a medical device distributor as part of a promotion, purchase data of the first value link 202(1) may include the received medical devices.

In some embodiments, the supply mesh module 112, the supply mesh 200, or the trade engine module 114 may be further configured to display, to the second value link 202(2), the purchase price of the purchase data of the first value link 202(1). Whether the supply mesh module 112, the supply mesh 200, or the trade engine module 114 displays the purchase price may be based on a permission configuration of the supply mesh module 112, the supply mesh 200, or the trade engine module 114. In some embodiments, the first value link 202(1) may wish to display certain value link features (such as purchase data's purchase price) only to certain value links 202(1)-(*n*). For example, the first value link 202(1) may wish to display purchase data only to value links 202(1)-(*n*) that are connected to the first value link 202(1) via a transition 204. The first value link 202(1) may configure to the supply mesh module 112, the supply mesh 200, or the trade engine module 114 with permission configurations to enforce such data visibility to other value links 202(1)-(*n*).

In one embodiment, the trade engine module 114 may be further configured to automatically determine the amount of private currency of the transaction proposal. In some embodiments, the trade engine module 114 automatically determining the amount of private currency may include the trade engine module 114 receiving the value of the amount of private currency from the first value link 202(1). The first value link 202(1) may determine, at least in part, the amount of private currency of the transaction proposal. In other words, the first value link 202(1) may have at least some influence over how much it will charge the second value link 202(2) for the products/services that fulfill the second value link's 202(2) value link condition. In one embodiment, the first value link 202(1) may have complete control over how much it will charge the second value link 202(2). In other embodiments, the trade engine module 114 may set certain limits on the price the first value link 202(1) will charge.

In one or more embodiments, the trade engine module 114 automatically determining the amount of private currency may include the trade engine module 114 receiving the value of the amount of private currency from the second value link 202(2). The second value link 202(2) may determine, at least in part, the amount of private currency of the transaction proposal. In other words, the second value link 202(2) may have at least some influence over how much it is willing to pay the first value link 202(1) for the products/services that fulfill the second value link's 202(2) value link condition. In one embodiment, the second value link 202(2) may have complete control over how much it is willing to pay the first value link 202(1). In other embodiments, the trade engine module 114 may set certain limits on the price the second value link 202(2) can propose paying.

In some embodiments, automatically determining the amount of private currency of the transaction proposal may include determining a consensus of at least a portion of the two or more value links 202(1)-(n) of the supply mesh 200. The trade engine module 114 may query the at least a portion of the two or more value links 202(1)-(n) and receive one or more responses. The responses may include varying amounts of private currency. Each value link 202 of the at least a portion of the two or more value links 202(1)-(n) may determine for themselves what their responsive private currency amounts would be.

In some embodiments, the trade engine module 114 automatically determining the amount of private currency of the transaction proposal may include determining a mark to market amount of a product of the transaction proposal. In one embodiment, the mark to market amount may include a recent amount that a value link 202 paid for the same product or service. For example, the second value link 202(2) may be seeking to purchase 10 units of amoxicillin. The trade engine module 114 may determine that a third value link 202(3) was the most recent purchaser of amoxicillin and that the third value link 202(3) paid 13 units of private currency per unit of amoxicillin. Thus, the trade engine module 114 may determine that the mark to market amount for 10 units of amoxicillin is 130 units of private currency. The mark to market amount may include the most recent amount paid, an average of multiple recent amounts paid, or some other amount metric.

In one or more embodiments, the trade engine module 114 automatically determining the amount of private currency of the transaction proposal may include calculating the amount of private currency based on a market scale value, an initial purchase price value, and a depreciation percentage value. In one embodiment, the market scale value, marketScale, may include the current manufacturer/provider price value, $V_m$, of a product/service divided by the initial purchase price value, $V_0$, of the of the product/service. The trade engine module 114 may obtain the current manufacturer/provider price value from the manufacturer/provider (e.g., from an application programming interface (API) of a service operated by manufacturer/provider, from a database, or from some other data source). The trade engine module 114 may obtain the initial purchase price value from the distributed ledger copy 116(1), the supply mesh 200, a user device 120(1)-(n), or another data source.

In some embodiments, the depreciation percentage value, D, may include a value between 0 and 1 inclusive. The depreciation value may be based on a probability density function that is a function of time. The rate of decline for the depreciation percentage may be based on standard inventory churn rate, seasonal events, unusual events, or usage rate. For example, the more often a product/service is consumed, the less steep the rate of decline may be. The less often a product/service is consumed, the steeper the rate of decline may be. In some embodiments, the trade engine module 114 may determine a fairness factor value, f. The fairness factor value may include a number that helps adjust a maximum or minimum price. The fairness factor value may be associated with a single product/service or multiple product services. For example, the trade engine module 114 may include a first fairness factor value for the product Oxycodone, a second fairness factor value for the product Amoxicillin, and a third fairness factor value for the service of providing information technology (IT) services to an entity. In some embodiments, the trade engine module 114 may determine the fairness factor value based on a value agreed upon by one or more value links 202(1)-(n) of the supply mesh 200. The fairness factor may be tracked on the distributed ledger 116 and one or more value links 202(1)-(n) may change the fairness factor using the consensus mechanism of the distributed ledger 116. In other embodiments, the user devices 120(1)-(n) may vote on the fairness factor value, and the trade engine module 114 may receive the votes, tally the votes, and determine the fairness factor value based on the votes.

In one embodiment, the trade engine module 114 automatically determining the amount of private currency may include calculating a maximum price, maximumPrice. The trade engine 114 may calculate the maximum price according to the following equation:

$$\text{maximumPrice} = \text{marketScale} * (V_0 + (V_0 * D)) \text{ where } (\text{marketScale} * V_0) < (V_0 * f)$$

In some embodiments, the trade engine module 114 automatically determining the amount of private currency may include determining a minimum price, minimumPrice. The trade engine module 114 may calculate the minimum price according to the following equation:

$$\text{minimumPrice} = \text{marketScale} * (V_0 - (V_0 * D)) \text{ where } (\text{marketScale} * V_0) > (V_0 * f)$$

The trade engine module 114 automatically determining the amount of private currency may include the trade engine module 114 selecting a private currency amount between the minimum price and the maximum price, inclusive.

Figure 3:
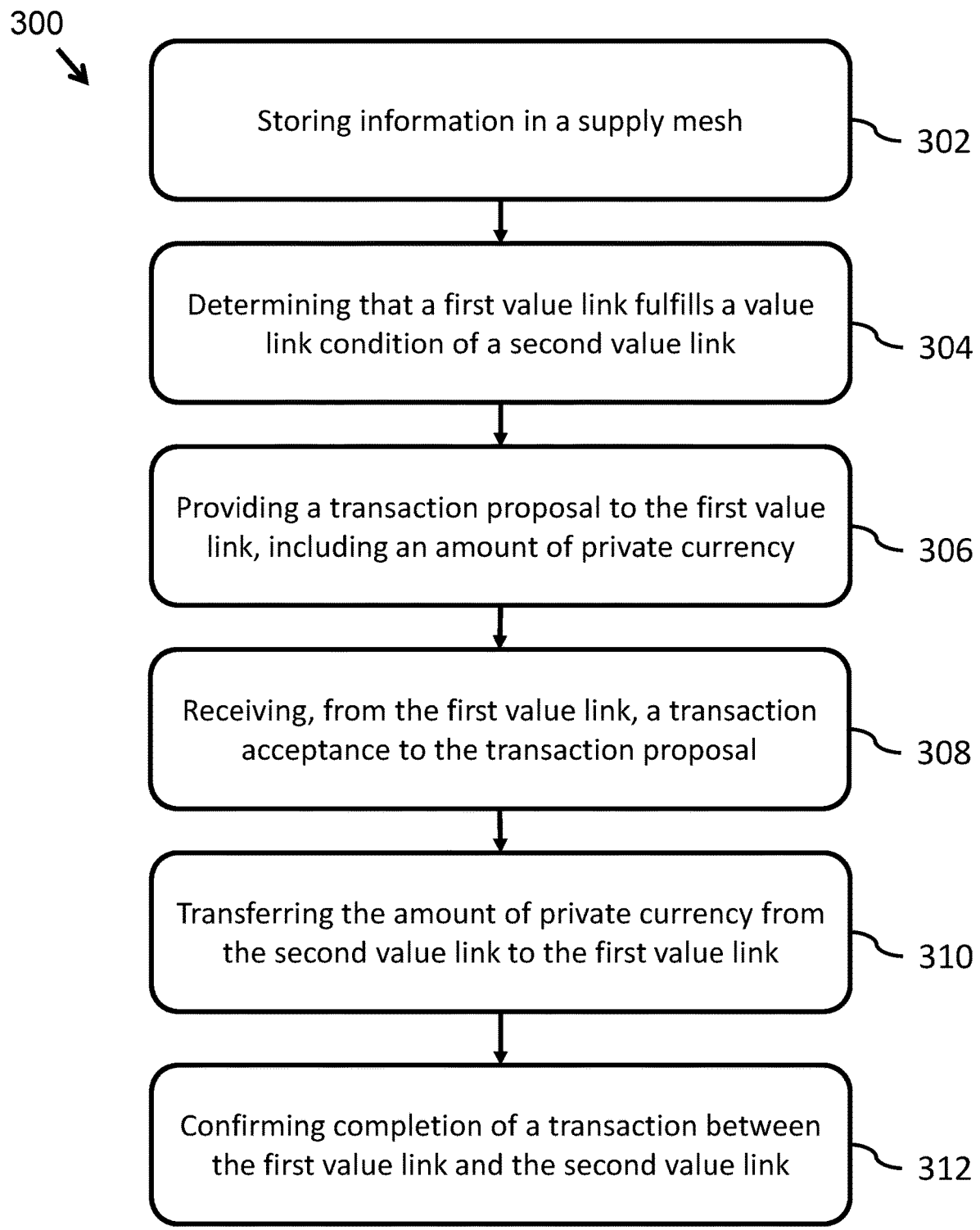
FIG. 3 is a flowchart diagram illustrating one embodiment of a method for a private currency and trade engine.

FIG. 3 depicts one embodiment of a method 300. The method 300 may include a computer-implemented method. The method 300 may include one or more steps. The method 300 may include storing 302 information in a supply mesh. The supply mesh may include two or more value links. The method 300 may include determining 304 that a first value link of the two or more value links fulfills a value link condition of a second value link. The method 300 may include providing 306 a transaction proposal to the first value link. The transaction proposal may include an amount of private currency. The method 300 may include receiving 308, from the first value link, a transaction acceptance to the transaction proposal. The method 300 may include transferring 310 the amount of private currency from the second value link to the first value link. The method 300 may include confirming 312 completion of a transaction between the first value link and the second value link. The transaction may be based on the transaction proposal.

In some embodiments, the supply mesh may include the supply mesh 200 of FIG. 2. The information stored in the supply mesh 200 may include the one or more value links 202(1)-(n), the one or more transitions 204(1)-(n), one or more value link features, or other information associated with the supply mesh 200. The two or more value links may include two or more of the value links 202(1)-(n) of the supply mesh 200. In one embodiment, the trade engine module 114 may perform one or more of the steps of the method 300. One or more of the steps of the method 300 may include functionality similar to that described previously in relation to the system 100 or the supply mesh 200.

In some embodiments, the method 300 may further include providing a distributed ledger. The distributed ledger may include the distributed ledger of the system 100 with the distributed ledger copies 116(1)-(n). The distributed ledger may be configured to store one or more distributed ledger transactions. In one embodiment, at least one distributed ledger transaction of the one or more distributed ledger transactions may include a transfer of an inventory amount from the first value link to the second value link.

FIG. 4A depicts one embodiment of a distributed ledger transaction 400 (hereinafter, "transaction 400"). The transaction 400 may include formatted data that may describe a transfer of an inventory amount. The transaction 400 may include one or more fields 410. A field of the fields 410 may include a category of data. Other names for a field may include a feature, category, key, or other similar concepts. The transaction 400 may include one or more values 450. A value of the values 450 may include a value that the corresponding field may take on.

The transaction 400 may include a source value link field 412. The corresponding source value link value 452 may include data describing the source value link (in this example, the first value link 202(1)) associated with the transaction 400. The source value link may include the value link 202(1) that is providing a product/service to another value link 202(2). The source value link value 452 may include a name of the first value link 202(1), a unique identifier corresponding to the first value link 202(1) (e.g., a username, an ID number, etc. provided by the supply mesh 200, supply mesh module 112, trade engine module 114, distributed ledger 116, or another component), or other data used to identify the first value link 202(1).

The transaction 400 may include a destination value link field 414 and a corresponding destination value link value 454. The destination value link value 454 may include data describing the destination value link (in this example, the second value link 202(2)) associated with the transaction 400. The destination value link may include the value link 202(2) that is receiving the product/service from the source value link 202(1). The destination value link value 454 may include data in a similar format to that of the source value link value 452.

The transaction 400 may include a subject field 416 and a corresponding subject value 456. The subject value 456 may include data that describes the subject of the transaction 400. The subject of the transaction 400 may include the product/service being sent/provided by the source value link 202(1). The subject value 456 may include a string of text, a unique identifier (e.g., each product/service tracked by the trade engine module 114 may include a different unique identifier), or some other data that identifies the subject of the transaction 400.

The transaction 400 may include a subject amount field 418 and a corresponding subject amount value 458. The subject amount value 458 may include data describing how much product/service the source value link 202(1) is providing to the destination value link 202(2). The transaction 400 may include a subject amount unit field 420 and a corresponding subject amount unit value 460. The subject amount unit value 460 may include data describing the unit of measurement of the subject of the transaction. For example, as seen in FIG. 4A, the transaction describes Business A sending Business B 30 (subject amount value 458) 10 milligram pills (subject amount unit value 460) of Oxycodone (subject value 456).

The transaction 400 may include a timestamp field 422 and a corresponding timestamp value 462. The timestamp value 462 may include a timestamp of when the transaction 400 was generated by the trade engine module 114, or a distributed ledger node of a user device 120, a timestamp of when the transaction 400 was added to the distributed ledger via the consensus mechanism of the distributed ledger network, or some other timestamp associated with the transaction 400. In some embodiments, the transaction 400 may include additional data such as a hash of at least a portion of the transaction 400, links to data associated with the transaction 400 where that data is stored external to the transaction 400, or other data. In one or more embodiments, some fields 410 and their corresponding values 450 may be combined into a single field and value. For example, the subject field 416 and value 456, subject amount field 418 and value 458, and subject amount unit field 420 and value 460 may be combined into a single field and value in the transaction 400.

In one embodiment, the at least one distributed ledger transaction 400 may further include the amount of private currency transferred from the second value link to the first value link. FIG. 4B depicts another embodiment of the distributed ledger transaction 400. The transaction 400 includes several components described in relation to the transaction 400 of FIG. 4A, which will not be repeated here. The transaction 400 may include a private currency amount field 424 and corresponding private currency amount value 464. The private currency amount value 464 may include data describing the amount of private currency sent to the source value link 202(1) in exchange for the subject of the transaction 400.

In some embodiments, the method 300 may further include tracking, on the distributed ledger, for each of value link of the two or more value links, an inventory amount, and a private currency balance. In one embodiment, tracking on the distributed ledger may include the trade engine module 114 reading data from the transactions 400 of the distributed ledger copy 116(1). Tracking on the distributed ledger may include the trade engine module 114 updating data stored by the trade engine module 114 based on the read data. The trade engine module 114 may store data based on the distributed ledger transactions 400 in another format such that the trade engine module 114 may quickly or efficiently determine inventory amounts or private currency balances. The data stored by the trade engine may include data stored in a file, database, or on another device, or data stored in memory, in a persistent storage location, or other location. In some embodiments, the trade engine module 114 storing data based on the distributed ledger transactions 400 may allow the trade engine module 114 to obtain an inventory amount or private currency balance without having to rescan or reread the distributed ledger copy 116(1) each time.

In some embodiments, the method 300 may further include receiving purchase data of the first value link 202(1). The purchase data may include a purchase price or an inventory amount. The purchase data may be similar to the purchase data described previously. For example, the purchase data may include data about products or services received, manufactured, or otherwise procured by the first value link 202(1) from a source outside of the value links 202(1)-(n) of the supply mesh 200. The method 300 may further include recording, on the distributed ledger, at least a portion of the purchase data. For example, the node of the user device 120(1) associated with the first value link 202(1) may generate a distributed ledger transaction 400 describing at least a portion of the purchase data. The node may send the transaction 400 to other nodes in order for the transaction 400 to be added to the distributed ledger 116 according to the consensus mechanism.

Figure 5A:
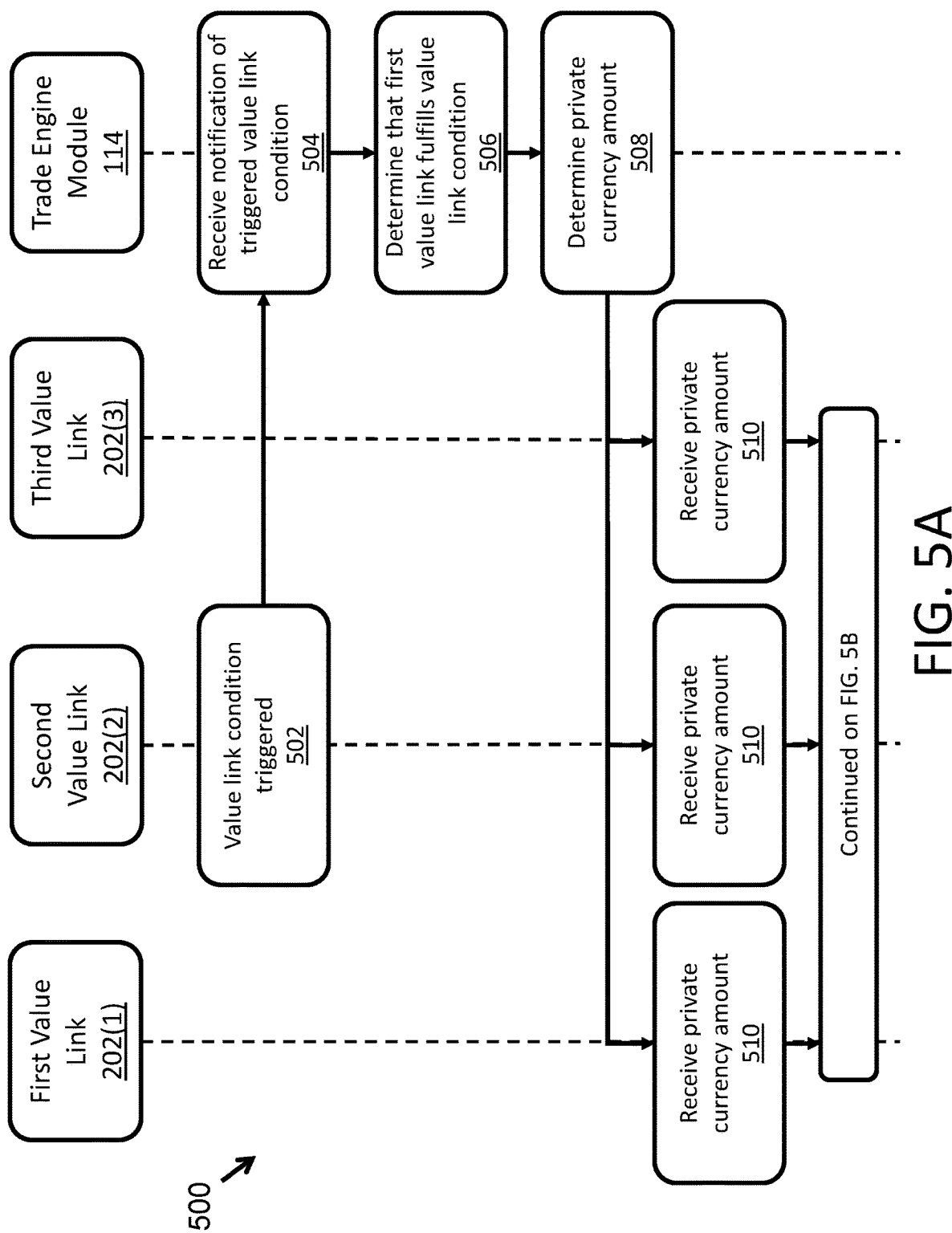
FIG. 5A is a flowchart diagram illustrating one embodiment of a process for private currency amount determination for a private currency and trade engine.
Figure 5B:
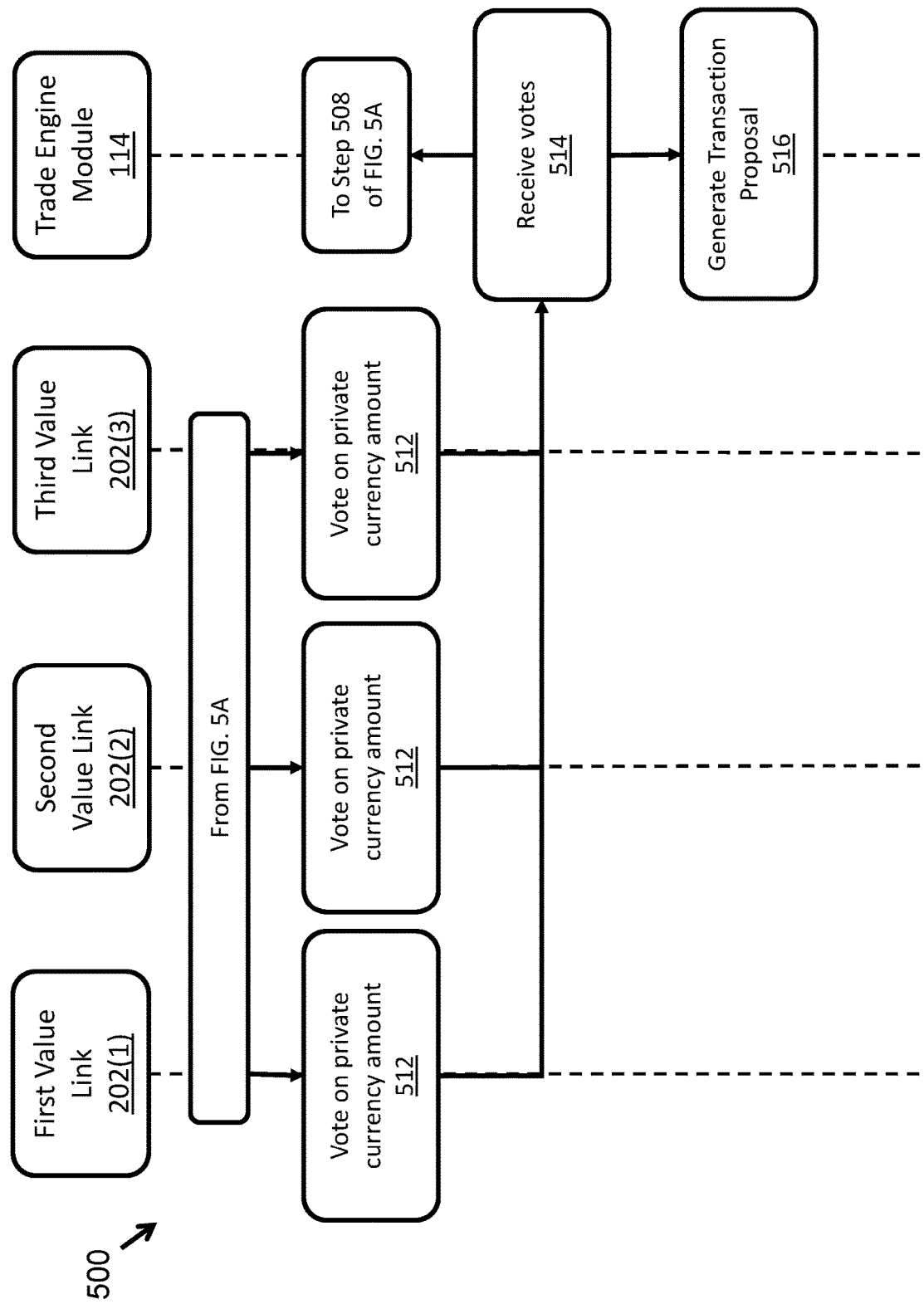
FIG. 5B is a flowchart diagram illustrating one embodiment of a process for private currency amount determination for a private currency and trade engine.

FIG. 5A and FIG. 5B depict one embodiment of a process 500 for private currency amount determination. The process 500 may be used for determining the amount of private currency to include in a transaction proposal. At least a portion of the process 500 may be included in automatically determining the amount of private currency to include in the transaction proposal. The process 500 begins in response to a value link condition of the second value link 202(2) being triggered 502, as discussed herein. The second value link 202(2) may send notification of the value link condition being triggered to the trade engine module 114. The trade engine module 114 may receive 504 the notification of the triggered value link condition from the second value link 202(2). The trade engine module 114 may determine that the first value link 202(1) fulfills the value link condition, as discussed herein in relation to step 304 of the method 300 and elsewhere.

The trade engine module 114 may determine 508 a private currency amount. The private currency amount may include the amount the trade engine module 114 proposes to include the transaction proposal. The trade engine 114 may automatically determine the amount of private currency as has been discussed herein. The trade engine module 114 may send the value of the amount of currency to one or more value links 202(1)-(n). The one or more value links 202(1)-(n) may include at least a portion of the two or more value links 202(1)-(n) of the supply mesh 200. The one or more value links 202(1)-(n) may receive 510 the value of the private currency amount. The one or more value links 202(1)-(n) may vote 512 on the value of the private currency amount. A value link 202 voting on the value of the private currency amount may include the value link 202 voting to either approve or reject the value of the amount of private currency.

The trade engine 114 may receive 514 the votes of the one or more value links 202(1)-(n). In response to a predetermined threshold of value links 202(1)-(n) approving the value of the amount of private currency, the trade engine module 114 may generate 516 the transaction proposal. Generating 516 the transaction proposal may be similar to the step 306 of the method 300. In response to a number of value links 202(1)-(n) approving the value of the amount of private currency not reaching the predetermined threshold, the process 500 may move back to step 508 where the trade engine 114 determines 508 another private currency amount to be voted upon. In some embodiments, the predetermined threshold may include a majority, a super-majority, or some other proportion of the one or more voting value links 202(1)-(n).

In one embodiment, transferring 310 the amount of private currency may include transferring the amount of private currency from the second value link 202(2) to a computer-implemented escrow. The computer-implemented escrow may include an escrow of the trade engine module 114. Transferring 310 the amount of private currency may include transferring the amount of private currency from the escrow to the first value link 202(1) in response to confirming 312 completion of the transaction.

The following includes one embodiment of pseudo code that provides price determination functionality. The pseudo code may be implemented as computer-readable instructions on a computing device such as the server 110 or a user device 120. In some embodiments, the supply mesh module 112, the trade engine module 114, or a client program on a user device 120 may implement at least a portion of the pseudo code as computer-readable instructions.

```
#Low Inventory Trigger at Hospital A
#Issue the new drug "drug.X"received by Hospital.B
Issue drugs when Hospital.B receives a new shipment
SampleLedger.issue Hospital.B { "name": "drug.X",
"open": true } 10 10 '{"date": "mm-dd-yyyy",
"receivedby": "Pharmacist"}'
#Example flow
#Availability check function in Trade Engine (TE) for
automated trigger on low inventory drug.X
TE. inventoryrequest Hospital.A {"drug.X"}
#Trade Engine does an internal inventory poll from the
data platform for the Hospital System ABC which is the
overarching organization Hospital A,B and C
Availableinventory
drug.X.available==TE.dataplatform.inventorypoll
{"drug.X": HospitalSystem.AB}
#Trade Engine return availablity of drug.X at Hospital B
to Hospital A. Hospital A then trigger the manual fair pricing
process at the Trade Engine (TE)
#Trade Engine pulls a fair price for drug.X. Fair price is
determined based on customized trading rules in the Trade
Engine.
Fairprice drug.X.price==TE.Fairprice.request {drug.X}
#The Trade Engine triggers a consensus process loop for
the three trading partners. Consensus is achieved once all
three partners agree on a manual fair price for drug.X given
a special circumstance.
TE.manualfairpricing.drug.X {HospitalSystem.ABC}
IF
drug.X.priceproposal.A==drug.X.priceproposal.B==drug.X.
priceproposal. C
    THEN Fairprice drug.X. price==drug.X.priceproposal.A
    ELSE manualfairpricing.drug.X {HospitalSystem.ABC}
#Once group consensus is achieved, the manual fair price
is submitted.
```

Figure 6A:
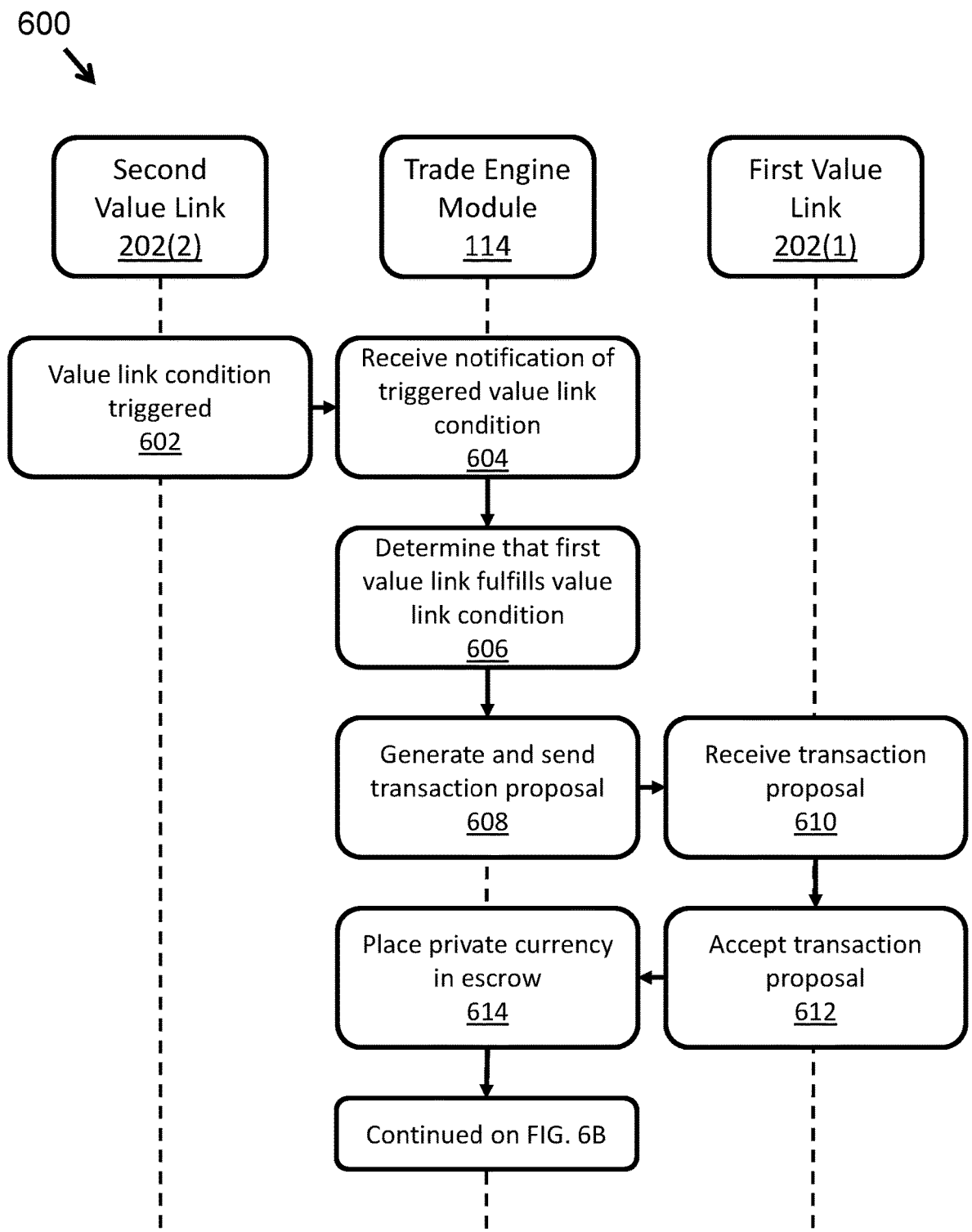
FIG. 6A is a flowchart diagram illustrating one embodiment of a process for escrow services for a private currency and trade engine.
Figure 6B:
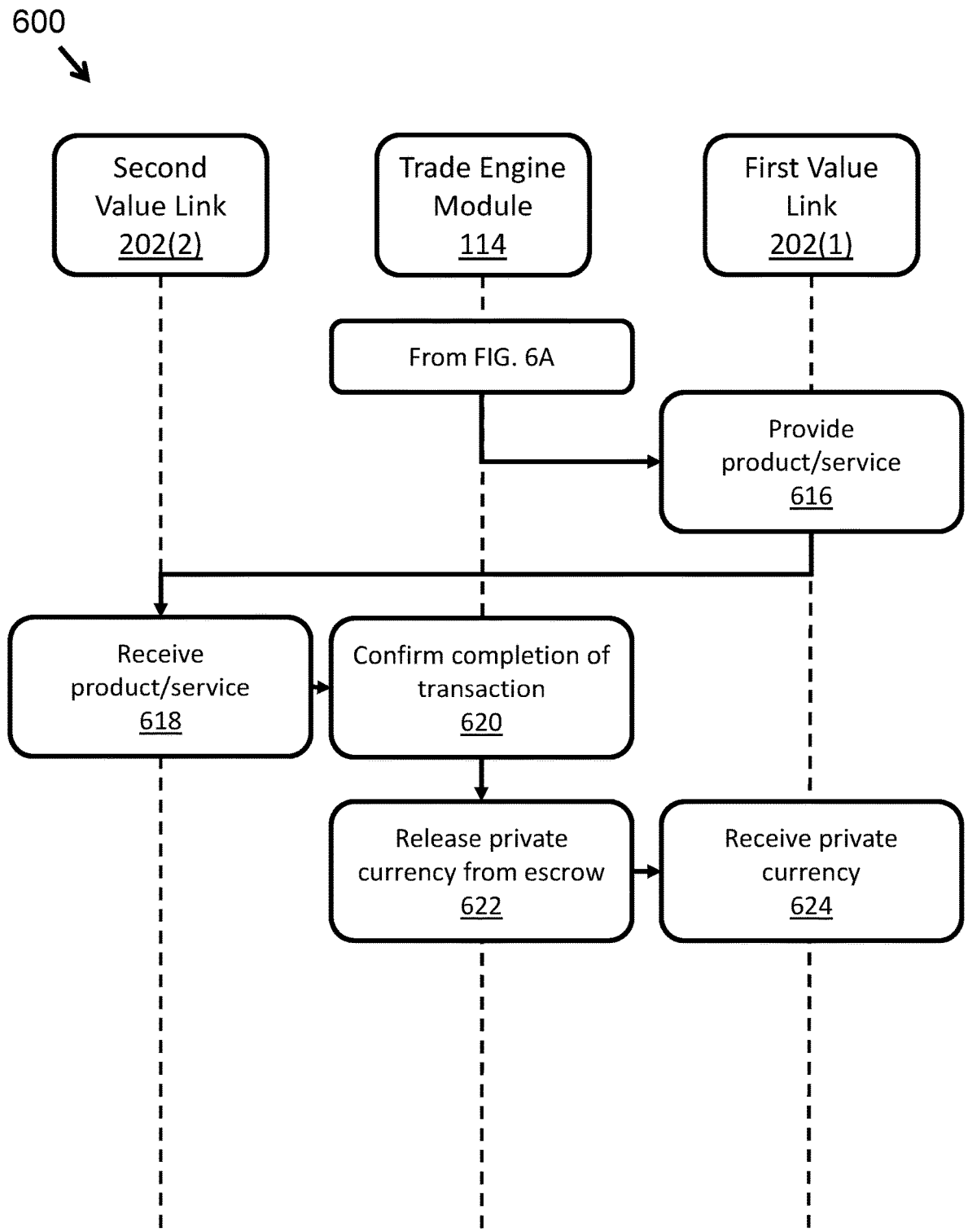
FIG. 6B is a flowchart diagram illustrating one embodiment of a process for escrow services for a private currency and trade engine.

FIG. 6A and FIG. 6B depict one embodiment of a process 600 for escrow services of the trade engine 114. The process 600 begins in response to a value link condition of the second value link 202(2) being triggered 602. This may be similar to step 502 of the process 500 of FIG. 5 and similar discussion found herein. The trade engine module 114 may receive 604 notification of the triggered value link and determine 606 that the first value link 202(1) fulfills the value link condition, which may be similar to steps 504 and 506 of the process 500 and similar discussion found herein. The trade engine module 114 may generate and send 608 a transaction proposal to the first value link 202(1). Generating the transaction proposal may include determining a private currency amount to include in the transaction proposal, details of which have been discussed previously.

The first value link 202(1) may receive 610 the transaction proposal. The first value link 202(1) may accept the transaction proposal and send a notification of the acceptance to the trade engine module 114. The trade engine module 114 may place 614 the amount of private currency of the second value link 202(2) in an escrow. For example, the trade engine module 114 may deduct the private currency amount from the balance of the second value link 202(2) and increase the private currency balance of the escrow by the same amount. In another example, the trade engine module 114 may generate a distributed ledger transaction that indicates that the private currency balance of the second value link 202(2) is reduced by the private currency amount and that the balance of the escrow is increased by the same amount.

The first value link 202(1) may provide 616 the product/service to the second value link 202(2) that fulfills the value link condition of the second value link 202(2). The second value link 202(2) may receive 618 the product/service. The trade engine module 114 may confirm 620 completion of the transaction between the first value link 202(1) and the second value link 202(2). This may be similar to the step 312 of the method 300.

The trade engine module 114 may release 622 the amount of private currency from the escrow. In response, the first value link 202(1) may receive 624 the amount of private currency. These steps 622, 624 may include the trade engine module 114 updating a private currency balance of the first value link 202(1) that is stored by the trade engine module 114, or generating a distributed ledger transaction reflecting the updated balance of the first value link 202(1), as has been described herein.

The following includes one embodiment of pseudo code that provides escrow functionality. The pseudo code may be implemented as computer-readable instructions on a computing device such as the server 110 or a user device 120. In some embodiments, the supply mesh module 112, the trade engine module 114, or a client program on a user device 120 may implement at least a portion of the pseudo code as computer-readable instructions.

Historic Event
Issue the new drug "drug.X"received by Hospital.B
Issue drugs when Hospital.B receives a new shipment
SampleLedger.issue Hospital.B {"name": "drug.X", "open": true}10 10 '{"date": "mm-dd-yyyy", "receivedby": "Pharmacist"}'
Example flow
Trade is initiated with inventory request function in Trade Engine (TE)
TE. inventoryrequest Hospital.A {"drug.X": 5}
Trade Engine does an internal inventory poll from the data platform for the Hospital System AB which is the overarching organization for Hospital A and Hospital B
Availableinventory drug.X.available==TE.dataplatform.inventorypoll {"drug.X": HospitalSystem.AB}
Trade Engine pulls a fair price for drug.X. Fair price is determined based on customized trading rules in the Trade Engine
Fairprice drug.X.price==TE.Fairprice.request {drug.X}
Hospital.A reviews the available inventory and the proposed price and agrees to the proposed trade
Hospital.A proposes trade of 5 units of drug.X from Hospital.B
TE.traderequest Hospital.A {"Hospital.B": drug.X: 5: drug.X.price}
Hospital.B accepts the trade proposed by Trade Engine.
Trade Engine escrows private currency for 5 units of drug.X from Hospital.B. Price is drug.X.price.
TE.escrow {Hospital.A : Hospital B : drug.X: 5: drug.X.price}
Trade Engine calls related Distributed Ledger (here SampleLedger) for escrow lock of private currency
SampleLedger.preparelockunspentfrom Hospital.A {"drug.X":5}->lock-txid & lock-vout
After the drug arrived at Hospital.A the escrow is resolved and private currency as payment is released to Hospital.B
TE.escrow.close {Hospital.A : Hospital B : drug.X: 5: drug.X.price}
SampleLedger.createrawexchange lock-txid lock-vout '{"": PRICE}'

Figure 7:
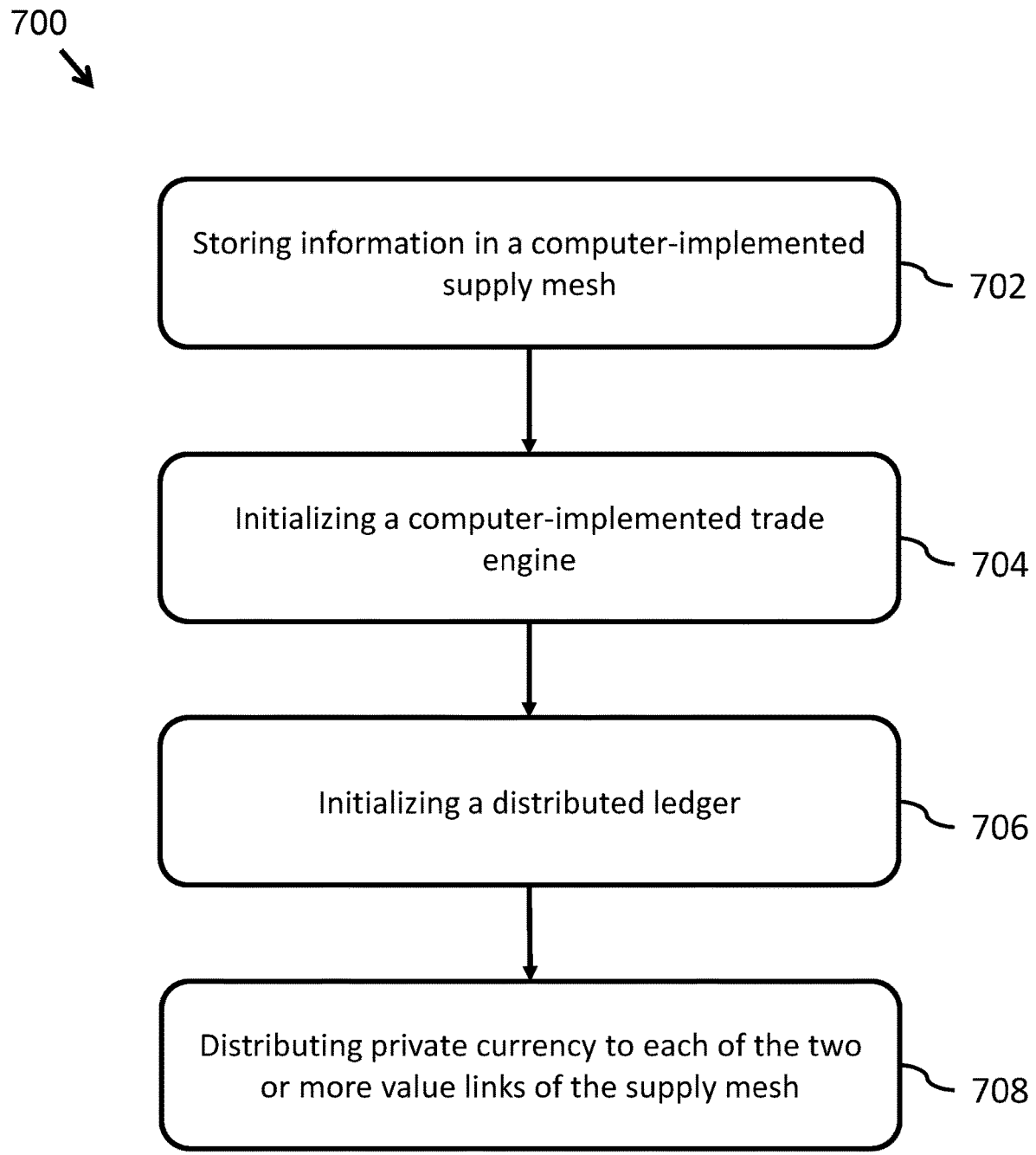
FIG. 7 is a flowchart diagram illustrating one embodiment of a method for a private currency and trade engine.

FIG. 7 depicts one embodiment of a method 700. The method 700 may include a computer-implemented method 700. The method 700 may include one or more steps. At least a portion of the one or more steps 700 may be performed by the server 110, the supply mesh module 112, or the trade engine module 114, or another component of the system 100.

The method 700 may include storing 702 information in a computer-implemented supply mesh. The supply mesh may include two or more value links. The method 700 may include initializing 704 a computer-implemented trade engine. The trade engine may include one or more computer-readable instructions that, when executed by a processor, cause the trade engine to determine that a first value link of the two or more value links fulfills a value link condition of a second value link. The method 700 may include initializing 706 a distributed ledger. The distributed ledger may track, for each value link of the two or more value links of the supply mesh, an inventory amount and a private currency balance. The method 700 may include distributing 708 private currency to each of the two or more value links of the supply mesh. Distributing 708 private currency to each of the two or more value links may include providing different amounts of private currency to different value links 202(1)-(n).

In some embodiments, the supply mesh may include the supply mesh 200 of FIG. 2. Storing 702 information in the supply mesh may include the storing information in the distributed ledger or storing information accessible via the distributed ledger 116, and the supply mesh 200 being in data communication with the distributed ledger 116 (e.g., via the distributed ledger copy 116(1)).

In one or more embodiments, the computer-implemented trade engine may include the trade engine module 114. Initializing 704 the trade engine may include installing the trade engine module 114 on the server or causing one or more processors of the server 110 to execute the trade engine module 114. Initializing 704 the trade engine may include causing the trade engine module 114 to be in data communication with the supply mesh 200 (e.g., the trade engine module 114 may automatically search for the supply mesh module 112, the supply mesh 200, or distributed ledger copy 116(1) data on the server 110 and configure itself to read data from and write data to one or more of these components). In one embodiment, the first value link and the second value link of the two or more value links may include, respectively, the first value link 202(1) and the second value link 202(2) of the supply mesh 200. The value link condition of the second value link 202(2) may include a value link condition as has been described herein.

In some embodiments, initializing 706 the distributed ledger may include setting up a distributed ledger node on the server 110. Setting up the node may include installing the node on the server 110. Setting up the node may include generating a blank distributed ledger (i.e., a distributed ledger with no transactions or with only a genesis transaction, block, etc.). Setting up the node may include the node coming into data communication with another node of the distributed ledger network. The node may receive distributed ledger data from the other node (e.g., one or more transactions that are included in the distributed leger 116). The node may use the received distributed ledger data to generate the distributed ledger copy 116(1).

In some embodiments, the existence and execution of the supply mesh module 112 or supply mesh 200 on the sever 110 may pre-date the existence or execution of the trade engine module 114 on the server 100. The existence of the distributed ledger copy 116(1) on the server 110 may pre-date the existence or execution of the trade engine module 114. In one embodiment, the existence of the distributed ledger copy 116(1) on the server 110 may pre-date the existence or execution of the supply mesh module 112 or the supply mesh 200 on the server 110.

In one embodiment, distributing 708 private currency to each of the two or more value links of the supply mesh may include providing an equal amount of private currency to each value link 202 of the supply mesh 200. In one or more embodiments, distributing 708 private currency to each of the two or more value links of the supply mesh may include providing a first amount of private currency to the first value link 202(1) in response to the first value link 202(1) purchasing, from the trade engine module 114, the first amount of private currency with a second type of currency. The second type of currency may include a fiat currency, a cryptocurrency, or some other medium of value. The first value link 202(1) may send an amount of the second type of currency to the trade engine module 114, and the trade engine module 114 may generate a distributed ledger transaction giving a the corresponding first amount of private currency to the first value link 202(1). The trade engine module 114 may distribute the generated transaction to other distributed ledger nodes in order to be added to the distributed ledger via the consensus mechanism. In another embodiment, the trade engine module 114 provide the first amount of private currency to the first value link 202(1) without adding the first amount of private currency to the distributed ledger 116 (e.g., the trade engine module 114 may track the private currency balance of the first value link 202(1) internally and without disclosing the balance to other value links 202(2)-(n)).

As an example, the first value link 202(1) may send credit card data to the trade engine module 114, along with data indicating the first value link 202(1) wishes to purchase 100 units of private currency. The first value link may send this data via the client software installed on the user device 120(1). The trade engine module 114 may receive the data from the user device 120(1). The trade engine module 114 may calculate the first amount of private currency based on an exchange rate between the private currency and the second type of currency. For example, the exchange rate may be 1 unit of private currency per 1 U.S. dollar. The trade engine module 114 may calculate to provide 100 units of private currency for $100. The trade engine module 114 may send the credit card data to a payment processor for payment processing. The trade engine module 114 may generate a distributed ledger transaction 400 indicating that the first value link's 202(1) private currency balance has increased by 100.

In one embodiment, the trade engine module 114 may restrict the amount of private currency a value link 202 may purchase. This may be because introducing too much private currency into the community of value links 202(1)-(n) too quickly may disrupt the value of the private currency. The restriction may be based on a determined value of the private currency, a time period (e.g., only a certain amount of private currency can be purchased in a given time period), or some other circumstance.

In some embodiments, distributing 708 private currency to each of the two or more value links of the supply mesh may include providing a first amount of private currency to the first value link 202(1) based on an amount of products the first value link 202(1) has received from other value links 202(2)-(n) of the two or more value links 202(1)-(n). For example, in one embodiment, the more products/services the first value link 202(1) receives from other value links 202(2)-(n), the more private currency the trade engine module 114 may distribute 708 to the first value link 202(1). The first amount of private currency may be equal to the amount of private currency the first value link 202(1) spent or based on some other metric. In another example, the more products/services the first value link 202(1) sends to other value links 202(2)-(n), the less private currency the trade module 114 may distribute 708 to the first value link 202(1).

In some embodiments, distributing 708 private currency to each of the two or more value links of the supply mesh may include periodically providing private currency to each of the two or more value links 202(1)-(n). For example, distributing 708 private currency may include providing an initial amount of private currency to one or more value links 202(1)-(n) and may include providing additional amounts of private currency thereafter at periodic intervals. The amount of initial or additional private currency provided may be different for different value links 202(1)-(n). Periodically providing private currency may include providing the private currency annually, semi-annually, quarterly, monthly, weekly, daily, or some other periodic interval.

As a first example, the trade engine module 114 may initialize 704. The supply mesh 200 may include a first value link 202(1) and a second value link 202(2). The trade engine module 114 may distribute 708 1,000 units of private currency to each of the first value link 202(1) and the second value link 202(2). Over the next year, the first value link 202(1) may purchase products/services from the second value link 202(2) totaling 400 units of private currency. Over the same year, the second value link 202(2) did not purchase any products/services from the first value link 202(1), did not purchase any products/service from any other value link 202(3)-(n), and did not sell any products/services to any other value links 202(3)-(n). Also over the same year, the first value link 202(1) did not sell any products/services to other value links 202(2)-(n) and did not purchase any other products/services from the other value links 202(3)-(n).

Thus, the private currency balances of the first value link 202(1) and the second value link 202(2) are, respectively, 600 and 1,400.

Continuing the example, at the beginning of the next year period, the trade engine module 114 may distribute 708 additional private currency. The amount of additional private currency may be based on the amount of products/services provided or purchased from other value links 202. The first value link 202(1) may receive 1,400 units of private currency (because it purchased more), and the second value link may receive 600 units of private currency (because it purchased less).

In some embodiments, the trade engine module 114 may regulate the value of the private currency. Regulating the private currency may include determining how much to distribute 708 to value links 202(1)-(n), how much to remove from circulation, determining a price that a value link 202 can charge for a product/service, etc. In one embodiment, the one or more value links 202(1)-(n) may have some degree of influence over the regulation of the private currency. For example, the one or more value links 202(1)-(n) may vote on distribution 708 amounts, removal of currency amounts, price-setting policies (e.g., the fairness factor described above), or other regulation actions. In some embodiments, the regulation of the private currency may assist in the private currency maintaining its value or maintain a value above a certain threshold. The trade engine module 114 may include functionality to carry out the regulating actions.

As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s). Furthermore, although some module functionality is disclosed herein, some functionality associated with one module may be performed by a different module in some embodiments.

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processor devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processor device receives computer readable program instructions from the network and forwards the computer readable program instructions for storage in a computer readable storage medium within the respective computing/processor device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute on a supercomputer, a compute cluster, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatuses, systems, or computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present invention of a new and useful PRIVATE CURRENCY AND TRADE ENGINE, it is not intended that such references be construed as limitations upon the scope of this invention.

What is claimed is:

1. A computer-implemented method, comprising:
storing information in a supply mesh, wherein the supply mesh includes two or more value links;
tracking, in the supply mesh, for each value link of the two or more value links: an inventory amount and a private currency balance;
determining that a first value link of the two or more value links fulfills a value link condition of a second value link;
providing a transaction proposal to the first value link, wherein the transaction proposal includes an amount of private currency;
receiving, from the first value link, a transaction acceptance to the transaction proposal;
determining, automatically, the amount of private currency of the transaction proposal, wherein the amount of private currency of the transaction proposal comprises calculating the amount of private currency based on a market scale value, an initial purchase price value, and a depreciation percentage value;
transferring the amount of private currency from the second value link to the first value link; and
confirming completion of a transaction between the first value link and the second value link, wherein the transaction is based on the transaction proposal.

2. The computer-implemented method of claim 1, further comprising providing a distributed ledger, wherein the distributed ledger is configured to store one or more distributed ledger transactions.

3. The computer-implemented method of claim 2, wherein at least one distributed ledger transaction of the one or more distributed ledger transactions comprises a transfer of an inventory amount from the first value link to the second value link.

4. The computer-implemented method of claim 3, wherein the at least one distributed ledger transaction further includes the amount of private currency transferred from the second value link to the first value link.

5. The computer-implemented method of claim 2, further comprising tracking, on the distributed ledger, a computer-implemented escrow.

6. The computer-implemented method of claim 1, wherein the first value link fulfilling the value link condition of the second value link comprises at least one of:
a first inventory amount of the second value link being below a predetermined amount;
the first value link being willing to sell a second inventory amount at a predetermined amount of private currency; or
an expiration date of the second value link being a predetermined time period away from a predetermined date.

7. The computer-implemented method of claim 1, wherein transferring the amount of private currency comprises:
transferring the amount of private currency from the second value link to a computer-implemented escrow; and transferring the amount of private currency from the computer-implemented escrow to the first value link in response to confirming completion of the transaction.

8. The computer-implemented method of claim 1, further comprising receiving purchase data of the first value link, the purchase data including at least one of
a purchase price; or
an inventory amount.

9. The computer-implemented method of claim 8, further comprising recording, on a distributed ledger, at least a portion of the purchase data.

10. A system, including one or more non-transitory storage devices, the one or more non-transitory storage devices comprising:
a supply mesh, including two or more value links;
one or more computer-readable instructions, wherein the one or more computer-readable instructions, when executed by a processor, are configured to execute a trade engine, wherein the trade engine is configured to
determine that a first value link of the two or more value links fulfills a value link condition of a second value link,
provide a transaction proposal to the first value link, wherein the transaction proposal includes an amount of private currency,
receive, from the first value link, a transaction acceptance to the transaction proposal,
transfer, automatically, the amount of private currency from the second value link to the first value link, and
confirm completion of a transaction between the first value link and the second value link, wherein the transaction is based on the transaction proposal; and
a distributed ledger configured to track, for each value link of the two or more value links,
an inventory amount, and
a private currency balance.

11. The system of claim 10, wherein the trade engine is further configured to:
receive purchase data of the first value link, the purchase data comprising at least one of
a purchase price, or
an inventory amount; and
record, on the distributed ledger, the purchase data.

12. The system of claim 11, wherein the trade engine is further configured to display, to the second value link, the purchase price based on a permission configuration of the supply mesh.

13. The system of claim 10, wherein the trade engine being configured to confirm completion of the transaction between the first value link and the second value link comprises at least one of:
the trade engine being further configured to record the transaction on the distributed ledger; or
the trade engine being further configured to determine, from the distributed ledger, the completion of the transaction.

14. The system of claim 10, wherein the trade engine is further configured to automatically determine the amount of private currency of the transaction proposal.

15. The system of claim 14, wherein automatically determining the amount of private currency of the transaction proposal comprises determining a consensus of at least a portion of the two or more value links of the supply mesh.

16. The system of claim 14, wherein automatically determining the amount of private currency of the transaction proposal comprises determining a mark to market amount of a product of the transaction proposal.

17. The system of claim 14, wherein automatically determining the amount of private currency of the transaction proposal comprises calculating the amount of private currency based on a market scale value, an initial purchase price value, and a depreciation percentage value.

18. A system, comprising:
a supply mesh, including two or more value links;
a distributed ledger configured to track, for each value link of the two or more value links,
an inventory amount, and
a private currency balance; and
one or more computer-readable instructions, wherein the one or more computer-readable instructions, when executed by a processor, are configured to execute a trade engine, wherein the trade engine is configured to
distribute, to a first value link of the two or more value links, a first amount of private currency;
determine, automatically, that a second value link of the two or more value links fulfills a value link condition of the first value link,
provide a transaction proposal to the second value link, wherein the transaction proposal includes a second amount of private currency,
receive, from the second value link, a transaction acceptance to the transaction proposal,
transfer the second amount of private currency from the first value link to the second value link, and
confirm completion of a transaction between the first value link and the second value link, wherein the transaction is based on the transaction proposal.

19. The system of claim 18, wherein the trade engine being configured to distribute the first amount of private currency comprises the trade engine being configured to provide the first amount of private currency to the first value link in response to the first value link purchasing the first amount of private currency with a second type of currency.

20. The system of claim 18, wherein the trade engine being configured to distribute the first amount of private currency comprises the trade engine being configured to provide the first amount of private currency to the first value link based on an amount of products the first value link receives from other value links of the two or more value links.

* * * * *